T. F. WITHERBEE.

Tuyere.

No. 8,033. Reissued Jan. 8, 1878.

WITNESSES:

Chas. Nida

J. H. Scarborough.

INVENTOR:

T. F. Witherbee.

BY Munn & Co

ATTORNEYS.

N. PETERS, PHOTO-LITHOGRAPHER, WASHINGTON, D. C.

UNITED STATES PATENT OFFICE.

THOMAS F. WITHERBEE, OF PORT HENRY, NEW YORK.

IMPROVEMENT IN TUYERES.

Specification forming part of Letters Patent No. 176,913, dated May 2, 1876; Reissue No. 8,033, dated January 8, 1878; application filed September 29, 1877.

*To all whom it may concern:*

Be it known that I, THOMAS F. WITHERBEE, of Port Henry, in the county of Essex and State of New York, have invented a new and Improved Tuyere, of which the following is a specification:

My invention consists of a partition in the water-chamber, between the inlet and outlet pipes, to compel the water for cooling the tuyere to pass entirely around it, and in other features hereinafter described.

Figure 1:
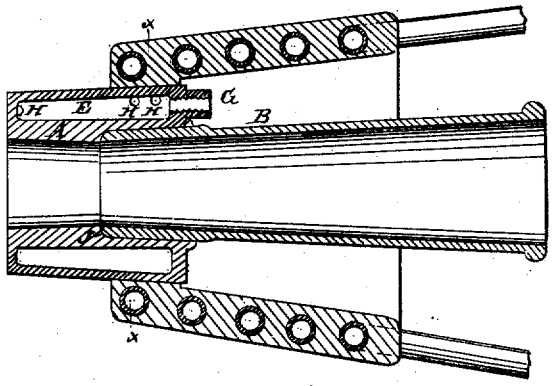
Figure 2:
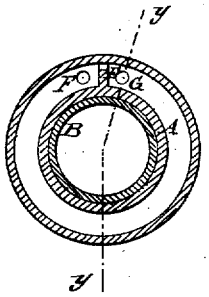
Figure 3:
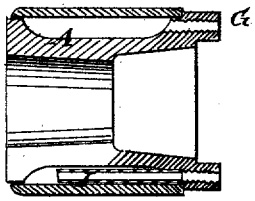

Figure 1 is a longitudinal sectional elevation of a tuyere constructed according to my invention, the section being taken on line *y y* in Fig. 2. Fig. 2 is a transverse section taken on line *x x* in Fig. 1. Fig. 3 represents a modification of my invention.

Similar letters of reference indicate corresponding parts.

A is the tuyere, and B is the nozzle of the air-pipe. E is a partition, arranged between the inlet-pipe F and the outlet G, to compel the water to pass entirely around the tuyere; but, to prevent air from collecting on the inlet side, I make the air-passages H through the partition, said passages being sufficient to let the air escape without much water.

I propose, as a modification of my invention, to dispense with the partition-plate, and use instead a long induction-tube, I, which enters the water-chamber at one end and passes to near the other end, as shown in Fig. 3. The induction-tube serves as a partition, to cause the water to circulate through the water-chamber and pass out through the eduction opening or tube G.

A socket, J, is formed in the tuyere for receiving the end of the nozzle B. The tuyere and nozzle are of the same internal diameter at the juncture of their inner surfaces, and from this point the tuyere is tapered divergingly, or in the opposite direction from the nozzle.

By inserting the nozzle in the socket J, and by flaring the tuyere after it leaves the end of the nozzle, the operation of cleaning is greatly simplified and facilitated, the lodgment of obstructions being to a great extent prevented.

This construction, besides affording the advantages already mentioned, avoids shoulders and recesses, and makes the passage through the tuyere smooth and uninterrupted, which renders the blast more effective.

The thickening of the inner wall of the tuyere consequent upon forming the socket J renders the tuyere more capable of resisting the thrusts of the cleaning-tool, which are often sufficient to puncture a tuyere having thin inner walls.

Having thus described my invention, I claim as new and desire to secure by Letters Patent—

1. The tuyere A, having a flaring or trumpet-shaped mouth, in combination with the blast-nozzle B, having the internal diameter of its front end coincident with the rear internal diameter of the tuyere, as and for the purpose set forth.

2. In a tuyere, the partition E, having the air-passages H, substantially as specified.

THOMAS FRANCIS WITHERBEE.

Witnesses:

REUBEN WHALLON,

F. A. PRICE.